(12) United States Patent
Caldwell et al.

(10) Patent No.: US 8,489,397 B2
(45) Date of Patent: Jul. 16, 2013

(54) METHOD AND DEVICE FOR PROVIDING SPEECH-TO-TEXT ENCODING AND TELEPHONY SERVICE

(75) Inventors: Charles David Caldwell, Cliffwood Beach, NJ (US); John Bruce Harlow, Middletown, NJ (US); Robert J. Sayko, Colts Neck, NJ (US); Norman Shaye, Lakewood, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/609,918

(22) Filed: Sep. 11, 2012

(65) Prior Publication Data

US 2013/0003945 A1  Jan. 3, 2013

Related U.S. Application Data

(63) Continuation of application No. 12/200,292, filed on Aug. 28, 2008, now Pat. No. 8,265,931, which is a continuation-in-part of application No. 11/275,876, filed on Feb. 1, 2006, now Pat. No. 7,433,818, which is a continuation of application No. 10/053,777, filed on Jan. 22, 2002, now Pat. No. 7,027,986.

(51) Int. Cl.
*G10L 15/00* (2006.01)
*G10L 15/26* (2006.01)
*G10L 15/06* (2006.01)
*G10L 17/00* (2006.01)

(52) U.S. Cl.
USPC ........ 704/235; 704/231; 704/270; 704/270.1; 704/239; 704/246; 704/247; 704/249; 704/250; 704/257; 379/88.01; 379/88.04; 434/185

(58) Field of Classification Search
USPC ....... 704/231–257, 271, 275, 270; 379/88.01, 379/88.07, 88.08
See application file for complete search history.

(56) References Cited

U.S. PATENT DOCUMENTS

| 5,157,759 A | 10/1992 | Bachenko |
| 5,559,857 A | 9/1996 | Dowens |
| 5,774,857 A | 6/1998 | Newlin |
| 5,839,109 A | 11/1998 | Iwamida |
| 5,905,774 A | 5/1999 | Tatchell et al. |
| 5,911,129 A * | 6/1999 | Towell ........................ 704/270.1 |
| 6,075,842 A | 6/2000 | Engelke et al. |

(Continued)

FOREIGN PATENT DOCUMENTS

| EP | 0856976 | 11/1997 |
| GB | 2183880 | 6/1987 |
| WO | 01/16940 | 3/2001 |
| WO | 02/03693 | 1/2002 |

OTHER PUBLICATIONS

M Bazzani, et al. "PC-Based Telephone Comminication System for Deaf-Blind People, " Proc. of IEEE GLOBECOMM, Global Telecommunication Confernece, Hollywood, Florida, Nov. 1998 pp. 43-45.

*Primary Examiner* — Paras D Shah

(57) ABSTRACT

A machine-readable medium and a network device are provided for speech-to-text translation. Speech packets are received at a broadband telephony interface and stored in a buffer. The speech packets are processed and textual representations thereof are displayed as words on a display device. Speech processing is activated and deactivated in response to a command from a subscriber.

20 Claims, 3 Drawing Sheets

U.S. PATENT DOCUMENTS

| | | |
|---|---|---|
| 6,100,882 A | 8/2000 | Sharman et al. |
| 6,107,935 A | 8/2000 | Comerford et al. |
| 6,175,820 B1 | 1/2001 | Dietz |
| 6,307,921 B1 | 10/2001 | Engelke et al. |
| 6,332,122 B1 | 12/2001 | Ortega et al. |
| 6,463,415 B2 * | 10/2002 | St. John ........................ 704/273 |
| 6,546,082 B1 | 4/2003 | Alcendor et al. |
| 6,651,043 B2 * | 11/2003 | Ammicht et al. ............. 704/275 |
| 6,785,649 B1 * | 8/2004 | Hoory et al. .................. 704/235 |
| 7,436,939 B1 | 10/2008 | Packingham et al. |
| RE41,002 E * | 11/2009 | Liebermann .................... 379/52 |
| 2001/0005825 A1 | 6/2001 | Engelke et al. |
| 2002/0077833 A1* | 6/2002 | Arons et al. .................. 704/277 |
| 2002/0161579 A1 | 10/2002 | Saindon et al. |
| 2002/0169605 A1* | 11/2002 | Damiba et al. ................ 704/235 |
| 2003/0033145 A1* | 2/2003 | Petrushin ...................... 704/236 |
| 2003/0125952 A1 | 7/2003 | Engelke et al. |

* cited by examiner

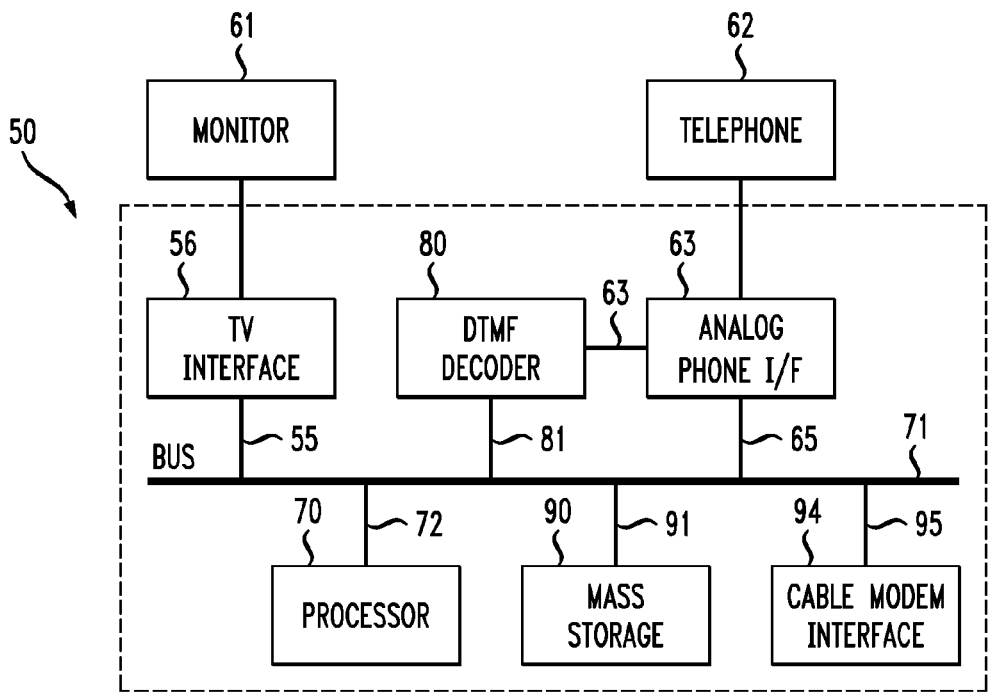

FIG. 5

```
Voice 1: <SPOKEN TEXT> [female]

Voice 2: <SPOKEN TEXT>        [male] [laughing]
```

FIG. 6

```
. . .
. . . DTMF 3 PRESSED.
```

FIG. 7

```
. . .
. . . CALL WAITING ACTIVE.
. . .
. . . RINGING ...
. . .
. . . CALL ANSWERED
```

METHOD AND DEVICE FOR PROVIDING SPEECH-TO-TEXT ENCODING AND TELEPHONY SERVICE

This application is a continuation of U.S. patent application Ser. No. 12/200,292, filed Aug. 28, 2008, which a continuation-in-part of U.S. patent application Ser. No. 11/275,876 filed on Feb. 1, 2006, which is a continuation of U.S. patent application Ser. No. 10/053,777 filed on Jan. 22, 2002, now U.S. Pat. No. 7,027,986 and herein incorporated by reference in their entirety.

BACKGROUND

The present invention relates to telephony services for hearing-impaired individuals, but more specifically to an automated speech-to-text encoding/decoding method and apparatus for use in a data communication network.

Hearing impaired inconveniences individuals encounter when using a telephone or other voice communication device. These individuals require special equipment, such as an electronic Teletype device, so that they may read whatever is being "said" by a party at the other end of a call. Alternatively, hearing-impaired individuals may use a third-party telecommunication relay service (TRS) offered by the service provider which, under the American Disabilities Act, must provide this service if requested by the hearing-impaired individual. TRS services require a live operator who uses a Teletype machine to transcribe speech into text, and perhaps also to transcribe text into speech. To access a TRS service, the hearing-impaired individual dials a special TRS telephone number to establish a connection with the TRS operator. When initially contacted to place a call, the operator will complete the second leg of the call to the called party. An impaired or non-impaired person may initiate the call to an impaired or non-impaired individual by calling a TRS operator.

In addition to being cumbersome, the aforementioned procedures require that the calling party know in advance whether the called party is impaired. Moreover, these types of services do not provide the hearing-impaired individual with transparent, unimpaired telephone service. In addition, the service provider must bear the cost of providing TRS services.

SUMMARY OF THE INVENTION

The present invention addresses the aforementioned problems by assisting the communication needs of hearing-impaired subscribers and is particularly suited for use in almost any type of network, such as a packet data network (Internet Protocol (IP), circuit-switched, or asynchronous transfer mode (ATM)) that offers VoIP (Voice over IP) services. Such networks and/or associated terminal devices possess specific hardware and software elements that may be configured to implement features of the present invention without substantial additional costs. The invention may also be implemented in an end-to-end public-switched telephone network (PSTN), digital subscriber line (DSL), or other routing or circuit-switched network.

In accordance with an embodiment of the invention, there is provided an automated speech-to-text encoding and decoding method and device for use by hearing-impaired subscribers. In an illustrative embodiment, a broadband telephony interface (BTI) also known as a multimedia terminal adapter (MTA), which may include cable modem functionality, serves as an interface between a communication network and a subscriber. The BTI includes a display interface that drives a conventional display device, such as a TV monitor, to display textual information and a telephone interface that connects with an audible device, such as a telephone, to convey voice information. In a preferred embodiment, the BTI includes a speech buffer to receive and store speech packets and a digital signal processor that processes speech data in the buffer to convert speech information to text.

In another embodiment of the invention, the BTI includes a database that stores voice and/or speech patterns of frequent callers so that a speech analyzer "recognizes" incoming voice patterns of such callers based on a comparison of real time, incoming speech data with database information. This enables the BTI to annotate the text with specific names or identities of the callers as text is displayed on the monitor.

In yet another embodiment of the invention, the BTI's internal processor analyzes tonal and inflection patterns of certain segments of speech in order to modify textual representations of decoded speech displayed on the monitor, such as by adding punctuation or emphasis. The BTI may also include a voice and/or speech pattern database that stores speech segments identified with certain types of users (e.g., male or female) so that the processor may access the database to identify and/or display a characteristic or attribute of the caller (e.g., male, female, anger, or happiness) according to an analysis of the speech. The BTI may further include a detector, e.g., a dual-tone multiple frequency (DTMF) detector, that responds to subscriber inputs to activate and deactivate speech pattern or type recognition.

In accordance with another aspect of the invention, a method of providing automated speech-to-text translation for a hearing-impaired individual includes interfacing with a network to obtain transmitted speech information, receiving real time speech information, converting the speech information to text, and displaying the converted information on a monitor. Optionally, the method additionally includes analyzing speech information to determine the identity of a caller based on previously stored speech segments and displaying a visual representation of the speech, punctuation, and/or the result of the analysis.

Other aspects of the method include recognizing speech patterns of prior callers based on previously-stored speech patterns, prompting a subscriber to obtain and store speech patterns of callers, recognizing a characteristic or attribute of a caller, and prompting a subscriber to turn-on (e.g., activate) or turn-off (e.g., deactivate, pause, clear, or temporarily suspend) a certain functionality of the broadband interface.

Other features, aspects and advantages will become apparent upon review of the following drawings taken in connection with the accompanying description. The invention, though, is pointed out with particularity by the appended claims.

BRIEF DESCRIPTION OF THE DRAWINGS

FIG. 3 depicts a system diagram in accordance with a more detailed aspect of the present invention.

FIG. 4 illustrates one manner of speaker identification according to an aspect of the present invention.

FIG. 5 illustrates another manner of speaker identification according to an aspect of the present invention.

FIG. 6 shows textual feedback on a monitor resulting from action taken by a subscriber according to a feature of the present invention.

FIG. 7 illustrates display of status information on a monitor according to another feature of the present invention.

DESCRIPTION OF ILLUSTRATIVE EMBODIMENTS

In an illustrative embodiment, the invention extends existing VoIP (Voice over IP) services to hearing-impaired individuals. Speech-to-text translation methods and apparatuses described herein may be performed by or provided in the network itself, or in terminal-based customer premises equipment (CPE) of a hearing-impaired individual.

Figure 1:
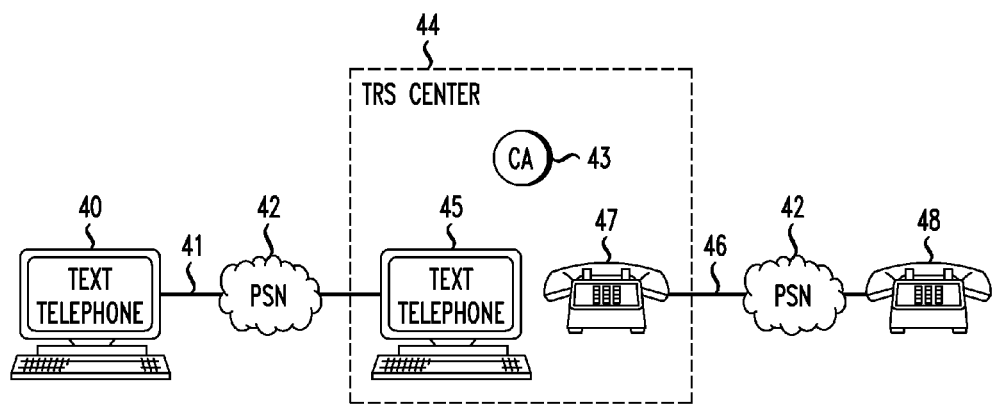
FIG. 1 shows a block diagram of a telecommunication relay service system in accordance with prior art.

FIG. 1 illustrates a conventional telecommunications relay service (TRS) used in a public switched network (PSN) 42 in which a hearing-impaired individual, i.e., a calling party, uses a text telephone (TT) 40 to establish a connection 41 over PSN 42 with a non-impaired individual in a communication relay session via a live communications assistant (CA) or TRS operator 43 located at a service center 44. Operator 43 provides a "relay" service and employs a compatible text telephone 45. The text telephones may comprise a personal computer, a data terminal, an ASCII-based Teletype device, a telecommunication device for the deaf (TDD), a TTY, and/or other means for generating and receiving text communications. Operator 43 ascertains with whom the hearing-impaired person desires to communicate, i.e., the called party, and thereafter establishes a voice connection 46 to establish a link between the operator's voice telephone 47 and the voice telephone 48 of the desired party. Communication proceeds by alternating between text communication and voice communication, as explained below.

In text communication, the hearing-impaired individual supplies text message segments to text telephone 40. The hearing-impaired individual completes each message segment by supplying an end-of-message code word, such as "GA," which means "go ahead," indicating that he or she has completed their message. The text message segments appear at text telephone 45 of the operator 43 who reads and then speaks messages into the operator's voice telephone 47, thereby relaying the messages so that the text messages supplied by the hearing-impaired individual are heard on the desired party's voice telephone 48.

When the non-impaired individual receiving the call hears the end of the message code word, he or she begins to speak into his or her voice telephone 48. Operator 43 hears, via the operator's voice telephone 47, that which is spoken by the non-impaired individual, and then transcribes and supplies the message to the operator's text telephone 45 for transmission to the first text telephone 40 of the hearing-impaired individual. When the non-impaired person finishes speaking, he or she says an end-of-message code word, e.g., "go ahead." When the hearing-impaired person reads the message at his or her text telephone 40, as transcribed by operator 43, he or she may enter a new message, or send an appropriate message such as "SK" to indicate the end of the relay session.

Figure 2:
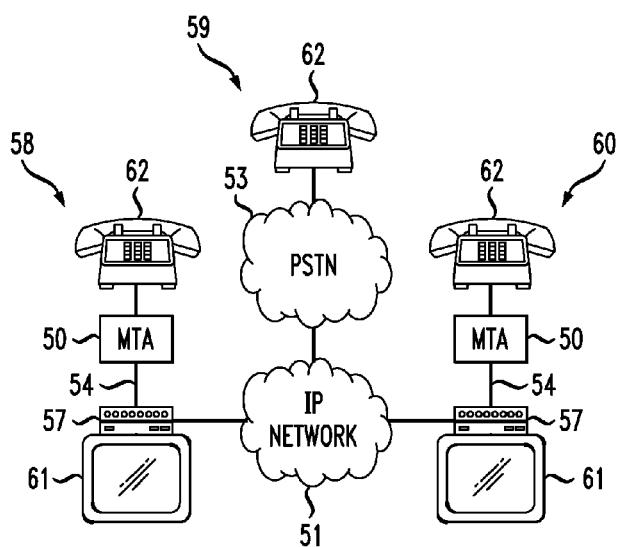
FIG. 2 depicts a block diagram of an exemplary system in accordance with an aspect of the present invention.

FIG. 2 illustrates an environment in which an embodiment of the present invention may be used to eliminate the cumbersome "relay" service described above. Other environments or architectures may be provided according to the methods and/or apparatuses described herein. The illustrated environment includes an IP network 51 that carries Internet traffic and a PSTN network 53 which carries telephone circuits. Cable modem 57 (or similar data terminal device) located at a first terminal end 58 of the network conveys data packets to and from IP network 51. Cable modem 57 (or similar data terminal device) located at a second terminal end 60 of the network similarly conveys data packets to and from the IP network 51. A third terminal end 59 of the network terminates at a conventional telephone 62, which is connected with PSTN 53 and which transfers information to and from the telephone. PSTN 53 and IP network 51 intercommunicate via conventional gateways and interfaces as known in the art. Either impaired or non-impaired individuals, as subsequently explained, may use the first and second terminal ends 58 and 60 of the network while the third terminal end 59 is suited for a non-impaired individual.

In accordance with an embodiment of the present invention, terminal end 58 located at the premises of a hearing-impaired subscriber includes a broadband terminal characterized by a multimedia terminal adapter (MTA) 50 that is also known as a broadband telephony interface (BTI). MTA 50 communicates with IP network 51 via cable modem 57. MTA 50 also has a display interface to enable visual display of text information on monitor 61 using conventional device drivers, as well as a telephone interface to link with a conventional telephone 62. By way of link 54, MTA 50 connects with a hybrid fiber coax (HFC) converter box 57 which, in turn, communicates with IP network 51 via an HFC network under established protocols, e.g., MCNS DOSCIS standards. Network interfacing of MTA 50 may also occur directly with network 51 when cable modem functionality is integrated with MTA 50. An HFC network is mentioned here only for illustrative purposes, and is not meant to limit the invention to such network.

A similar arrangement is provided at terminal end 60 of the network that may be located at the premises of a hearing-impaired or non-impaired individual. In the case where two hearing-impaired subscribers desire to talk to each other, a communication link is established between respective MTAs 50 at terminal ends 58 and 60. A non-impaired subscriber using a conventional telephone 62 located at terminal ends 59 or 60 may also communicate with a hearing impaired subscriber located at terminal end 58.

FIG. 3 depicts an exemplary MTA 50 in greater detail. MTA 50 includes functional components of a personal computer (PC), namely a processor 70 with buffers, registers, and random access memory, as well as a mass storage or memory device 90, such as a flash RAM, magnetic storage drive, or CDROM. Processor 70 preferably includes executable code that enables conversion of speech to text, and vice-versa, as well as encoding and decoding of IP packets conveyed over the IP network. The processor also utilizes speech data buffers typically implemented by RAM and performs the function of a tonal and inflection analyzer. Software executed by processor 70 may be downloaded from the network to which MTA 50 is connected, stored in a memory, and then executed from memory. Alternatively, certain processor functions may be implemented in hardware or firmware. Speech buffers within the processor 70, typically implemented by RAM, temporarily store speech data packets during speech processing. Processor 70 may perform the operations of a digital speech processor, or such a device (i.e., a commercially available CODEC (coder-decoder)) may be separately provided and interfaced with the processor 70 to encode/decode speech data packets.

MTA 50 also includes an analog (or digital) telephone interface 63 that interfaces with a conventional analog (or digital) telephone 62 and a television (or other conventional monitor) interface 57 employing, for example, NTSC, HDTV or other standards. The interface 57 conveys textual information to a monitor 61 using a standard format, i.e., it may perform or assist in performing the function of converting a television to a display device at the direction of a processor that controls MTA 50. Like many processing devices, a central bus 71 provides an information transfer path among various units within MTA 50.

As speech data is received from the network via cable modem interface 94, it is placed in a buffer of processor 70 on a first-in-first-out (FIFO) basis. When receiving speech data from the network, speech data in the buffer is automatically decoded by processor 70 to display textual information of spoken words, and optionally to add punctuation, exclamation, emphasis, highlighting, or other attributes of the speech. The size of the buffer in processor 70 may be fixed or variable according to needs of the system, e.g., processor speed, or the needs of hearing-impaired individuals, e.g., voice pattern identification, punctuation, text display rate, etc. Buffer size may be increased or decreased dynamically in accordance with encoding/decoding loading of the processor, or the subscriber may manually set or adjust the size of the buffer.

Thus, when used by a hearing-impaired subscriber located at terminal end 58 (FIG. 2), for example, and after a telephone link is established with another party, each word spoken by that other party is conveniently displayed on monitor 61 located in the subscriber's premises. Speech-to-text translation may be performed between two hearing-impaired subscribers located, for example, at terminal stations 58 and 60 (FIG. 2), or between a hearing-impaired subscriber and a non-impaired subscriber respectively located at terminal stations 58 and 59 (FIG. 2).

Processor 70, which performs speech/text CODEC functions, converts representations of voice signals received from user telephone 62 to a digital format and then transmits the resulting digital data to cable modem interface 94 and ultimately to cable modem 57 (FIG. 2) for conveyance over IP network 51. To convert spoken words sent from a remote station, e.g., terminal end 59, for display on a local monitor 61, processor 70 captures digital voice data packets on the data bus 71 (which were sent from a remote subscriber terminal), converts the digital voice signals to analog, and then encodes the analog voice to text for display on TV monitor 61. A hearing-impaired subscriber may then read the displayed message.

In one implementation, processor 70 receives packets that contain about ten to twenty milliseconds of speech data. As speech packets are received, they are routed to the processor's buffer and stored in a first-in-first-out (FTFO) order. By increasing the buffer size, speech-to-text processor 70 may "look-ahead" for various speech inflections or patterns. This enables the addition of punctuation, corrections or modifications to be made to the speech before being displayed on monitor 61 (FIG. 2). By way of an example, a brief but sustained period of silence allows processor 70 to infer the proper position of a period. A longer period of silence allows the processor to identify the beginning of a new paragraph. "Looking ahead," however, need not be the normal operating mode because the additional buffering and processing load may induce delay in the textual display function. This may depend on the speed and power of processor 70. More importantly, any delay may impact non-impaired subscribers because they must wait longer for a reply.

MTA 50 may also be programmed by the subscriber to respond to indications of a user, such as dual-tone multiple-frequency (DTMF) digits, via a controller (shown as DTMF decoder 80 for illustrative purposes only) to activate or deactivate the functionality desired by the subscriber. A keypad or keyboard for entering DTMF tones may be incorporated in MTA 50, or the keypad of an existing telephone may be detected in order to implement operating mode changes of MTA 50. Non-impaired persons may, for example, disable these functions when they use telephone 62. In effect, controller 80 (which, by the way, may also be implemented by processor 70) effects turn-on and turn-off of certain functionality in response to DTMF tones input by a subscriber so that, for example, telephone 62 (FIG. 2) may be used normally, e.g., without speech-to-text encoding, or to place the MTA apparatus in a "hearing-impaired" mode of operation where speech-to-text encoding takes place. Processor 70 may also be programmed to respond to respective unique DTMF tones to enable, disable, or adjust the period of a "look ahead" speech analysis feature provided by an internal speech buffer; to activate/deactivate an internal tonal and inflection analyzer; to increase or decrease the size of the speech buffer; to enable/disable speaker recognition capabilities; or to make other mode changes in MTA 50. The buffer may comprise internal memory and the inflection and tonal analyzer may comprise a software module, as known in the art.

With reference to FIG. 4, processor 70 provides the ability to determine, using speaker or voice pattern recognition, the actual identification (i.e., the name) of a particular speaker. This generally requires that the speaker had previously provided the MTA of the hearing-impaired subscriber with a speech sample, i.e., a prior call, whose characteristics were stored as a reference. The identification, once made, is stored in a voice and speech pattern database of storage device 90 (FIG. 3). Storage of speech samples for later recall is typically accomplished by a series of prompts generated by processor 70. For example, processor 70 may generate prompts on the monitor 61 (FIG. 2) requesting the hearing-impaired subscriber to respond through keypad or keyboard inputs in order to store a speech sample (e.g., voice pattern) in a database of storage device 90 for later recall, and to associate the stored sample with a name or other identification by inputting other information. When the same party later engages in a telephone conversation with the hearing-impaired individual, processor 70 effects visual presentation of the caller's identity on monitor 61 (FIG. 2), as shown in FIG. 4, based upon the previously provided speech sample which, in the illustrated example, is identified as "Mom" and/or "Dad." Processor 70 may also distinguish separate callers on a conference or "extension phone."

With reference to FIG. 5, processor 70 may separate and identify different speakers' voices based on sex, gender, or other characteristics. For example, text can be labeled as Voice 1: <spoken text>[female] and Voice 2: <spoken text> [male] [laughing], as depicted in FIG. 5. In addition, processor 70 may, without limitation, annotate textual presentations, such as providing an annotation whether the speaker is a male or female voice, child or adult, hard or soft-spoken, or whether the speaker is laughing, shouting, or other attributes of voice based on known characteristics of speech. To provide feedback of action ordered by the subscriber or action taken by the system, monitor 61 may display certain commands or prompts, as illustrated in FIG. 6, e.g., "DTMF 3 Pressed." In addition, textual presentations associated with commonly used audible signals of the network such as ringing, busy, all circuits busy, misdial warnings, etc., are displayed as exemplified in FIG. 7.

As previously indicated, the functionality provided by MTA 50 of FIG. 2 may reside at various elements of network 51 or 53, of FIG. 2 as opposed to being resident in MTA 50 located at a subscriber's premises. Having some of the functionality reside in the network of an existing network may benefit deployment of the inventive methods and apparatuses, and also may enable providing a service offering to hearing-impaired individuals not having ready access to an MTA 50.

When implemented in a network, aspects of the present invention may additionally support language translation at each end of a call when there is interaction with network elements performing such functions through, for example, common gate interchange (CGI) protocols. Furthermore, tonal inflections are easier for a mechanical translator to add, symbolically, in text form than in a direct verbal translation using synthetic voice. A conventional language database can be available as a download from the network and stored on the voice and speech pattern database 90.

The invention advantageously allows a subscriber to remotely "bridge" to a home unit (e.g., via wireless phone) and obtain transcription capability for a call. The transcription capability may be used for other business services (e.g., e-commerce). If combined with a PC, the present invention allows a subscriber to create his or her own voice-to-email application.

If two or more speakers simultaneously confer, the speech-to-text processor 70 (indicated in FIG. 3 as a digital signal processor) indicates in real time on monitor 61 which speaker is speaking using voice recognition data from the voice and speech pattern database 90 (indicated in FIG. 3 as "mass storage"). Whenever the database 90 has identified a speaker, based on speech samples previously analyzed by MTA 50, it displays the name of the speaker along with their associated text on monitor 61.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention.

We claim:

1. A method comprising:
   receiving an utterance;
   converting, via a processor, the utterance to text; and
   receiving a dual-tone multiple frequency tone indicating one of activating a function and deactivating the function; and
   when the dual-tone multiple frequency tone indicates activating the function:
     performing the function by analyzing the utterance, to yield an inflection pattern
     associated with the utterance and a characteristic of a user associated with the utterance;
     modifying the text based on the inflection pattern, to yield modified text; and
     displaying the modified text and the characteristic.

2. The method of claim 1, further comprising:
   receiving, via a dual-tone multiple frequency detector, an input indicating activation of the conversion of the utterance to the text.

3. The method of claim 1, further comprising:
   identifying the user based on speech segments stored in a database.

4. The method of claim 1, further comprising:
   identifying, using the utterance, one of a soft-spoken word, a hard-spoken word, shouting, laughter, and a human expression.

5. The method of claim 1, further comprising inserting punctuation into the modified text based on the inflection pattern.

6. The method of claim 1 wherein the characteristic comprises a gender.

7. The method of claim 1, wherein the characteristic comprises an accent.

8. A system comprising:
   a processor; and
   a computer-readable storage medium having instructions stored which, when executed by the processor, cause the processor to perform operations comprising:
   receiving an utterance;
   converting the utterance to text;
   receiving a dual-tone multiple frequency tone indicating one of activating a function and deactivating the function; and
   when the dual-tone multiple frequency tone indicates activating the function:

performing the function by analyzing the utterance, to yield an inflection pattern associated with the utterance and a characteristic of a user associated with the utterance;

modifying the text based on the inflection pattern, to yield modified text; and displaying the modified text and the characteristic.

9. The system of claim 8, the computer-readable storage medium having additional instructions stored which result in the operations further comprising:

receiving, via a dual-tone multiple frequency detector, an input indicating activation of the conversion of the utterance to the text.

10. The system of claim 8, the computer-readable storage medium having additional instructions stored which result in the operations further comprising:

identifying the user based on speech segments stored in a database.

11. The system of claim 8, the computer-readable storage medium having additional instructions stored which result in the operations further comprising:

identifying, using the utterance, one of a soft-spoken word, a hard-spoken word, shouting, laughter, and a human expression.

12. The system of claim 8, the computer-readable storage medium having additional instructions stored which result in the operations further comprising:

inserting punctuation into the modified text based on the inflection pattern.

13. The system of claim 8, wherein the characteristic comprises a gender.

14. The system of claim 8, wherein the characteristic comprises an accent.

15. A computer-readable storage device having instructions stored which, when executed by a computing device, cause the computing device to perform operations comprising:

receiving an utterance;

converting the utterance to text;

receiving a dual-tone multiple frequency tone indicating one of activating a function and deactivating the function; and when the dual-tone multiple frequency tone indicates activating the function:

performing the function by analyzing the utterance, to yield an inflection pattern associated with the utterance and a characteristic of a user associated with the utterance; and modifying the text based on the inflection pattern, to yield modified text; and displaying the modified text and the characteristic.

16. The computer-readable storage device of claim 15, the computer-readable storage device having additional instructions which result in the operations further comprising:

receiving, via a dual-tone multiple frequency detector, an input indicating activation of the conversion of the utterance to the text.

17. The computer-readable storage device of claim 15, the computer-readable storage device having additional instructions which result in the operations further comprising:

identifying the user based on speech segments stored in a database.

18. The computer-readable storage device of claim 15, the computer-readable storage device having additional instructions which result in the operations further comprising:

identifying, using the utterance, one of a soft-spoken word, a hard-spoken word, shouting, laughter, and a human expression.

19. The computer-readable storage device of claim 15, the computer-readable storage device having additional instructions which result in the operations further comprising:

inserting punctuation into the modified text based on the inflection pattern.

20. The computer-readable storage device of claim 15, wherein the characteristic comprises a gender.

* * * * *